United States Patent [19]
Minabe et al.

[11] Patent Number: 5,699,206
[45] Date of Patent: Dec. 16, 1997

[54] MAGNETIC RECORDING AND REPRODUCING APPARATUS ARRANGED TO SAVE ELECTRIC POWER CONSUMED IN DETECTING TAPE END AND REDUCE LOAD ON MICROPROCESSOR

[75] Inventors: Kouji Minabe; Hideo Nishijima, both of Hitachinaka; Kouji Kaniwa, Yokohama; Hiroya Abe, Hiratsuka; Yoshio Narita, Hitachinaka; Teruo Hoshi, Mito, all of Japan

[73] Assignee: Hitachi, Ltd., Tokyo, Japan

[21] Appl. No.: 540,219

[22] Filed: Oct. 6, 1995

[30] Foreign Application Priority Data

Oct. 12, 1994 [JP] Japan .................. 6-245836

[51] Int. Cl.⁶ .................................. G11B 15/08
[52] U.S. Cl. .................... 360/74.6; 242/333.1
[58] Field of Search ................ 360/74.6, 74.5, 360/74.7; 242/333, 333.1, 333.2, 333.6, 333.7

[56] References Cited

U.S. PATENT DOCUMENTS 5,222,003  6/1993  Miller et al. ............. 360/74.6
5,557,483  9/1996  Takahashi ............... 360/74.6

FOREIGN PATENT DOCUMENTS 56-145543  11/1981  Japan ............. 360/74.6
57-46342   3/1982   Japan ............. 360/74.6
58-41459   3/1983   Japan ............. 360/74.6
3-250444   11/1991  Japan .
6-12730    1/1994   Japan ............. 360/74.6

OTHER PUBLICATIONS

Ord 10/9 1mg.

*Primary Examiner*—Aristotelis M. Psitos
*Assistant Examiner*—James L. Habermehl
*Attorney, Agent, or Firm*—Antonelli, Terry, Stout, & Kraus, LLP

[57] ABSTRACT

A magnetic recording and reproducing apparatus arranged to use a magnetic tape. The apparatus operates to derive the current taken-up position of the magnetic tape from the signals that are proportional to the rotation frequencies of a capstan motor, a supply reel and a take-up reel. Only when the taken-up position is near the tape end, the apparatus activates LEDs (light emitting elements) for sensing the tape end and photo-transistors (light receiving elements), for sensing the tape end.

23 Claims, 6 Drawing Sheets

REEL HUB HAVING SMALL RADIUS

REEL HUB HAVING LARGE RADIUS

MAGNETIC RECORDING AND REPRODUCING APPARATUS ARRANGED TO SAVE ELECTRIC POWER CONSUMED IN DETECTING TAPE END AND REDUCE LOAD ON MICROPROCESSOR

BACKGROUND OF THE INVENTION

The present invention relates to a magnetic recording and reproducing apparatus for recording or reproducing data on a magnetic tape and more particularly to the apparatus that is arranged to save an electric power consumed in detecting a tape end and reduce a load on a microprocessor provided in the apparatus.

No light is allowed to pass through a tape on which magnetic substance is coated or evaporated. Hence, the magnetic recording and reproducing apparatus according to the prior art has arranged to use a magnetic tape having a light-transmittable, transparent area (called a leader tape) on the end of the tape. That is, the apparatus provides a light emitting circuit and a light receiving circuit. In operation, the light emitted by light emitting circuit passes through the light-transmittable area and is sensed by the light receiving circuit for detecting the ends of the tape.

As this kind of apparatus, a VTR is described in "Introduction to Home VTR", edited by Corona Publishing Co., Ltd., 1981, pp. 123 to 133.

SUMMARY OF THE INVENTION

The foregoing prior art, however, needs to actuate the light emitting circuit for emitting light continuously or periodically (at predetermined time intervals of time according to the switching operation) at all times and actuate the light receiving circuit for receiving the light, for the purpose of detecting the end of the tape in the same manner. The prior art is, therefore, disadvantageous in that both the light emitting circuit and the light receiving circuit have to constantly consume an electric power.

Further, the apparatus of the prior art provides an analog-to-digital converter (called an AD converter) loaded on a microprocessor, through which an output signal sent from the light receiving circuit is converted into a digital signal. Based on the digital signal, the presence or absence of light is determined. To execute this operation, the conventional apparatus is required to periodically operate the AD converter and a program for analyzing a digital value. This has been a continuous or periodic burden on the microprocessor.

To overcome this shortcomings, it is an object of the present invention to provide a recording and reproducing apparatus that is arranged to reduce the power consumption and/or load on a microprocessor provided in the apparatus.

In carrying out the object, a magnetic recording and reproducing apparatus according to an aspect of the invention provides means for sensing a current taken-up position of a magnetic tape. If the current taken-up position sensing means determines that the tape taken-up position is close to the end of the tape, the light emitting circuit is operated continuously or at predetermined intervals. If the taken-up position sensing means determines that the tape taken-up position is distant or away from the end of the tape, the light emitting circuit is made inoperative for saving the power consumption of the circuit.

If the taken-up position sensing means determines that the current tape taken-up position is close to the end of the tape, the apparatus operates to supply electricity to the light receiving circuit. If the taken-up position sensing means determines that the tape taken-up position is distant from the end of the tape, the apparatus operates to stop the distribution of electric power (called power distribution) to the light receiving circuit for saving the power consumption in the circuit.

Further, in the case of sensing the tape end through a microprocessor by analyzing the output signal of the light receiving circuit to determine the presence or the absence of passed light on the analyzed result, if the taken-up position sensing means determines that the current tape taken-up position is close to the tape end, the microprocessor is enabled for analyzing the received-light signal. If the taken-up position sensing means determines that the current tape taken-up position is distant from the tape end, the analyzing operation of the received-light signal is stopped for reducing the load on the microprocessor.

As described above, the magnetic recording and reproducing apparatus of the present invention has the foregoing means. Hence, the apparatus enables to turn off the light emitting elements for sensing the tape end and stop the power distribution to the light receiving circuit on most of the entire tape length while the tape is running. This makes it possible to greatly save the power consumption. In the case of apparatuses which use a microprocessor to analyze the received-light signal and sense the tape end based on the analyzed result, it becomes possible to stop the analyzing program on most of the entire tape length while the tape is running, thereby greatly reducing the load on the microprocessor.

DESCRIPTION OF THE PREFERRED EMBODIMENTS

Description will be oriented to a magnetic recording and reproducing apparatus according to an embodiment of the present invention with reference to the drawings.

Figure 1:
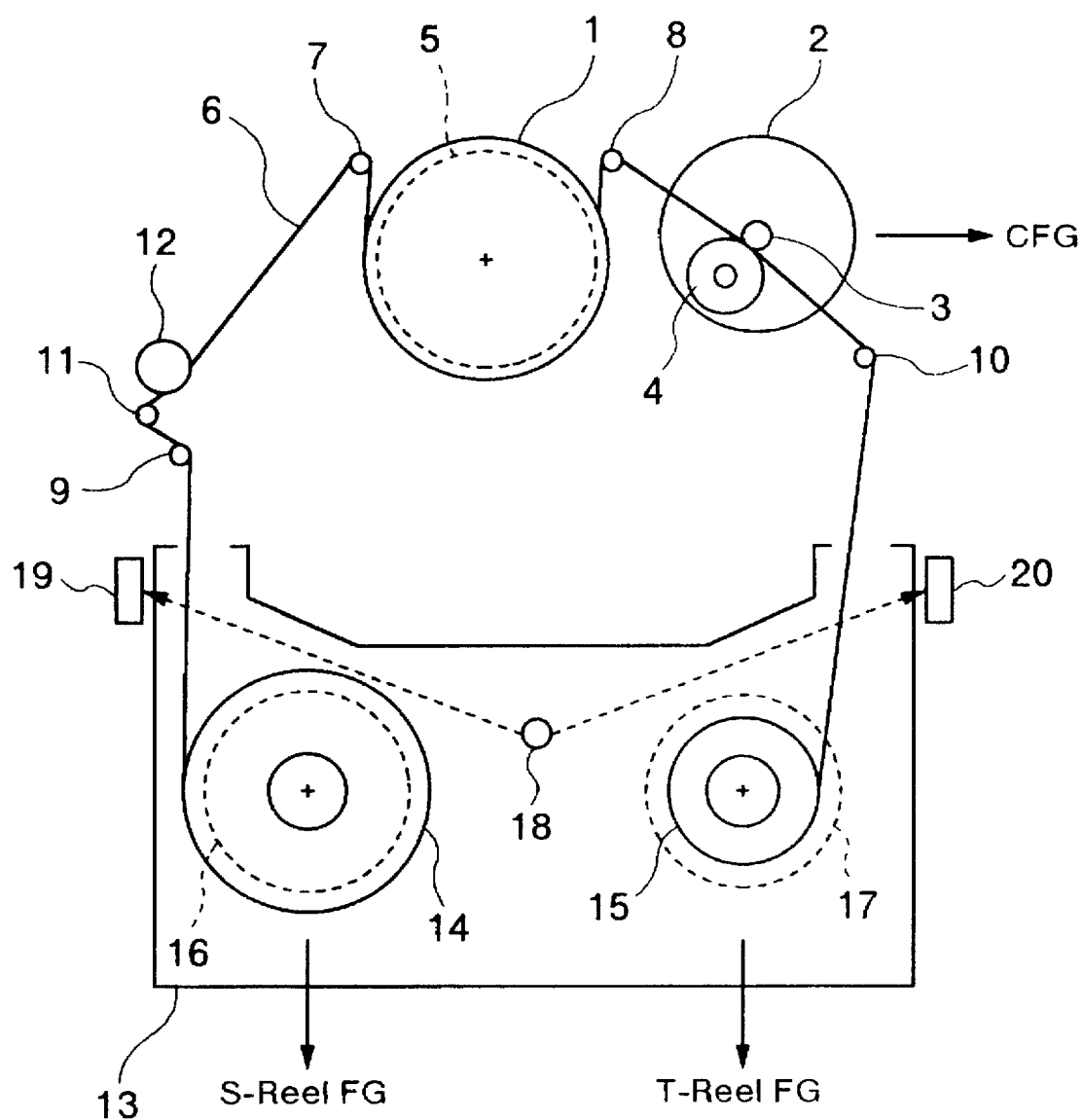
FIG. 1 is a view showing a construction of a tape running system included in a magnetic recording and reproducing apparatus according to an embodiment of the present invention.

FIG. 1 is a view showing a construction of a tape running system included in the magnetic recording and reproducing apparatus provided with an optical sensor for sensing a tape end.

The tape running system is constructed to have a head drum 1 on which a rotary head is mounted, a capstan motor 2 for running a tape, a capstan shaft 3, a pinch roller 4 on which the tape is running against the capstan shaft 3, a drum motor 5, the magnetic tape 6 having a light-transmittable area (called a leader tape) on both ends of the tape, tape guide pins 7, 8, 9, 10 for properly changing the direction of the tape, a tension pin 11 for keeping tape tension right, an impedance roller 12 for suppressing tape vibrations, a cassette half 13, a supply reel 14, a take-up reel 15, a supply reel gear 16, a take-up reel gear 17, a light emitting element (LED) 18, and light receiving circuits 19 and 20 for sensing a tape end, namely, circuits operating to sense light passed through the leader tape.

Next, the description will be oriented to the operation of the tape running .system included in this embodiment with reference to FIGS. 1, 4, 5A and 5B.

The principle on which the tape end is sensed will be described with reference to FIG. 4.

Figure 4:
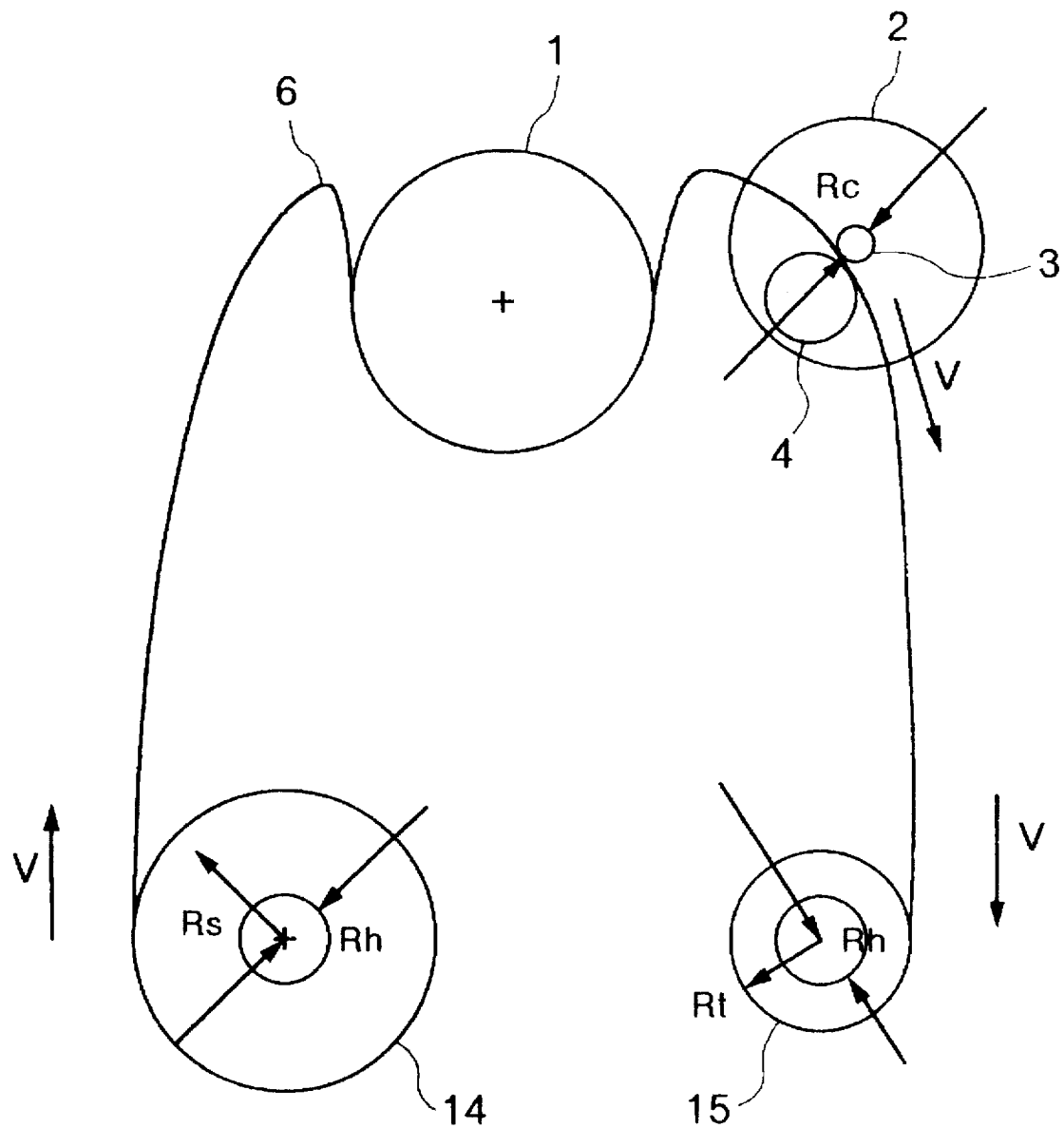
FIG. 4 is a view useful for describing the principle of sensing a tape end, on which the invention is operated.

As illustrated in FIG. 4, when the tape running is started, the following relation (1) is established among a tape running speed around the capstan shaft of the capstan motor, the tape running speed around the supply reel for supplying the tape, and a tape running speed around the take-up reel for taking up the tape, because those running speeds are equal to each other.

$$V = \frac{2\pi R_c}{T_c} = \frac{2\pi R_s}{T_s} = \frac{2\pi R_t}{T_t} \quad (1)$$

where V denotes a tape speed, $R_c$ denotes a radius of the capstan shaft, $T_c$ denotes a rotation period of the capstan motor, Rs denotes a radius of the supply reel containing the tape, $T_s$ denotes a rotation period of the supply reel, $R_t$ denotes a radius of the take-up reel, and Tt denotes a rotation period of the take-up reel.

To derive $R_s$ and $R_t$ from this relation, the following relation (2) can be obtained.

$$R_s = \frac{T_s}{T_c} \cdot R_c, R_t = \frac{T_t}{T_c} \cdot R_c \quad (2)$$

The rotation periods of the supply reel and the take-up reel are derived from signals (R-FG signal) that are proportional to the rotation frequencies of the supply reel and the take-up reel, respectively. The rotation frequency of the capstan motor is derived from a signal (C-FG signal) that is proportional to the rotation period of the capstan motor. For example, the input time of the S-Reel FG signal shown in FIG. 1 is sequentially measured by the microprocessor. The intervals between the adjacent inputted times are calculated for obtaining a period proportional to the rotation period of the supply reel. Likewise, the period that is proportional to the rotation period of the take-up reel is derived from the T-Reel FG signal. The period that is proportional to the rotation period of the capstan motor is derived from the C-FG signal. Since the radius $R_c$ of the capstan shaft is predetermined, the radii of the supply reel and the take-up reel each containing the tape are derived from the expression (2).

When the values of $R_s$ and $R_t$ derived as described above are close to the radius Rh of the reel hub, it indicates a high possibility that the taken-up position of the tape is close to the tape end. Here, the current taken-up position signifies how much of the tape is taken up or wound around the reel. That is, if the following relation (3) is met when the tape is running forward, it means that the tape soon reaches the end of the tape.

$$R_s - R_h < R_d \quad (3)$$

If the following relation (4) is met when the tape is running reverse, it means that the tape soon reaches the start of the tape.

$$R_t - R_h < R_d \quad (4)$$

where $R_d$ denotes a threshold value for determining the tape taken-up position. In addition, though the foregoing two expressions (3) and (4) have no equal sign, they may contain an equal signal depending on requirements for setting a threshold value, control hardware or software.

Figure 5A:
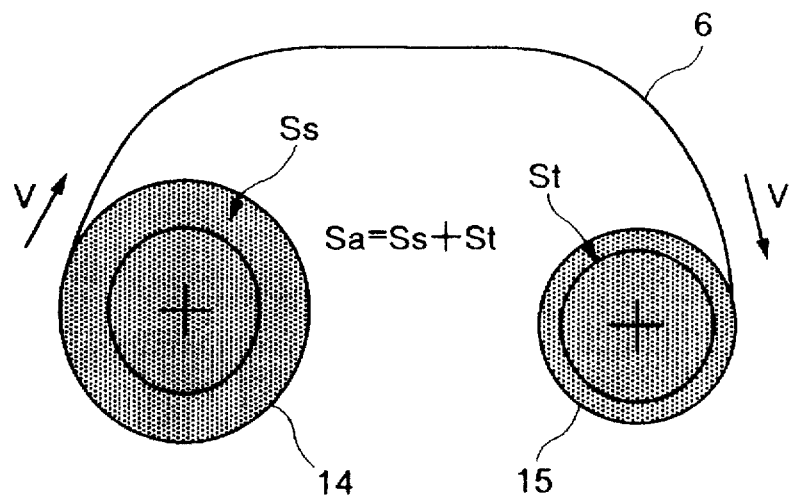
FIGS. 5A and 5B are views useful for describing the principle of sensing a tape end, on which the invention is operated.
Figure 5B:
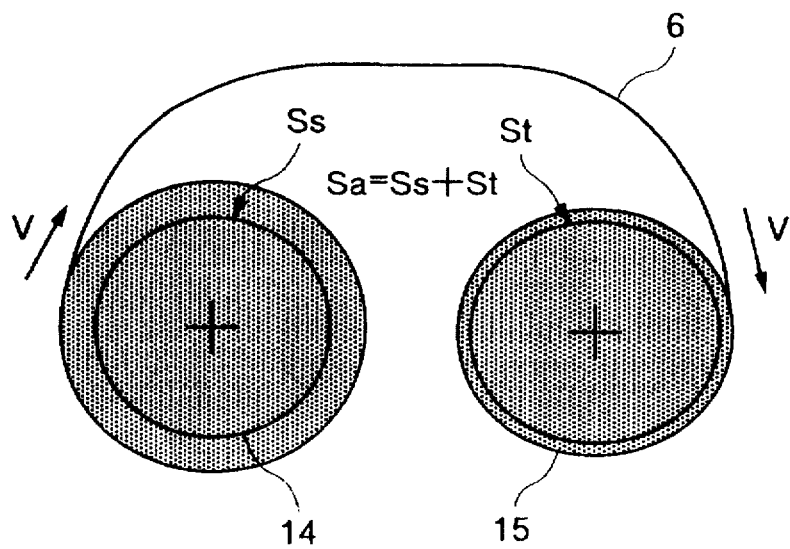

Further, the radius $R_h$ of the reel hub does not necessarily take one value. For example, for the VHS (Video Home System), as shown in FIGS. 5A and 5B, mainly, two radii of the reel hub, that is, a larger one and a smaller one are provided. In this case, the difference between the projected total areas of the tape shown in FIGS. 5A and 5B is used for determining the radius of the reel hub. The remarkable difference of the projected total areas appears between the smaller reel and the larger reel. The total area Sa of the tape can be obtained by the following expression (5)

$$S_a = \pi R_s^2 + \pi \cdot R_t^2 - 2\pi \cdot R_h^2 \quad (5)$$

where $R_s$ and $R_t$ are obtained from the expression (2). By substituting $R_s$ and $R_t$ for the expression (5), the following expression (6) can be obtained.

$$T_s^2 + T_t^2 = \frac{R_c^2}{\pi \cdot T_c^2} (S_a + 2\pi \cdot R_h^2) \quad (6)$$

The right side of the expression (6) is a quadratic function with respect to the radii of the reel hub. If, therefore, a sum of a square of the rotation period of the supply reel and a square of the rotation period of the take-up reel, as shown in the left side of the expression (6), is larger than a predetermined threshold value H, that is, the following expression (7) is met, it is determined that the reel hub used is the one having the larger radius.

$$T_s^2 + T_t^2 > H \quad (7)$$

As noted above, the radius of the reel hub can also be determined. Hence, $R_s$ and $R_t$ may be obtained by measuring the values of $T_s$, $T_t$ and $T_c$. If, therefore, the relation of the expression (3) or (4) is met, it is determined that the tape soon reaches the end or the start end of the tape.

Figure 2:
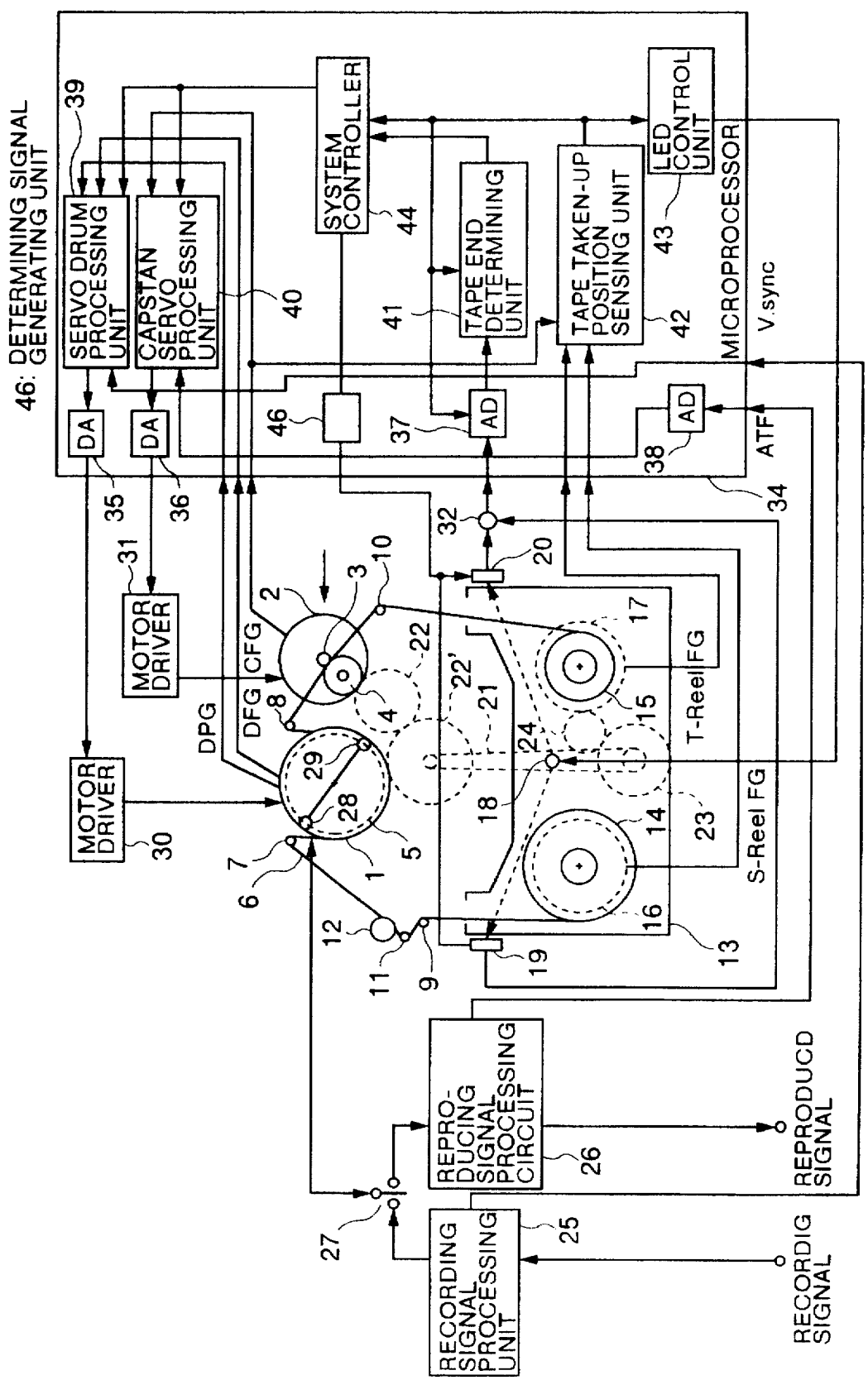
FIG. 2 is a block diagram showing an arrangement of the magnetic recording and reproducing apparatus shown in FIG. 1.

These series of calculations and determinations are executed by a tape taken-up position calculating unit 41 and a tape end determining unit 41 shown in FIG. 2. In response to the signals determined by the calculating unit and the determining unit, the light emitting elements contained in a light emitting circuit 18 are turned off except around the end of the tape. Further, by stopping the power distribution to the light receiving circuits 19 and 20, the power consumption is saved. The received-light signal obtained from the light receiving circuits 19 and 20 are read into a microprocessor 34 (see FIG. 2) through an AD converter 37 (see FIG. 2) for stopping the process for determining whether or not the current tape taken-up position reaches the end of the tape. This stoppage serves to reduce the load on the microprocessor.

As described above, the operation of sensing the taken-up position of the tape is effective after the magnetic tape is pressed between the pinch roller 4 and the capstan shaft 3 and the tape speeds around the supply and the take-up reels are synchronized with the tape speed around the capstan shaft. Hence, until the pinch roller is pressed against the capstan shaft 3 after loading the tape therebetween and the tape running is started for sensing the exact winding location of the tape, the light emitting elements are turned off, the power distribution to the light receiving circuit is stopped, and the processing of the output signal from the light receiving elements is stopped. These operations serve to prevent the erroneous operation of the recording and reproducing apparatus.

Next, description will be oriented to a magnetic recording and reproducing apparatus for a video signal according to an embodiment of the present invention. FIG. 2 shows an arrangement of the magnetic recording and reproducing apparatus for a video signal.

The magnetic recording and reproducing apparatus is arranged to have a belt 21 for transmitting a driving force of the capstan motor to a reel gear, gears 22, 22', 23 and 24 for transmitting the driving force of the capstan motor to the reel gear, a recording signal processing circuit 25 for mainly modulating a frequency of a recording signal, a reproducing signal processing circuit 26 for mainly demodulating the reproduced signal whose frequency is modulated, a switch 27 for switching an input of a modulating signal for the recording frequency to the rotating magnetic heads 28 and 29 or an output of a modulating signal for the reproducing frequency out of those heads, driving circuits 30 and 31 for driving the head drum motor and the capstan motor, a microprocessor 34, DA converters 35 and 36 for converting a digital signal into an analog signal, AD converters 37 and 38 for converting an analog signal to a digital signal, a drum servo processing unit 39 for generating a rotation control signal of the drum motor, a capstan servo processing unit 40 for generating a rotation control signal of the capstan motor, a tape end determining unit 41 for analyzing the output signals sent from light receiving circuits 19 and 20 for sensing a tape end and determining the tape end based on the analyzed result, a tape taken-up position sensing unit 42 for deriving an FG signal that is proportional to a rotation frequency of the supply reel and the take-up reel and an FG signal that is proportional to the rotation frequency of the capstan motor, an LED control unit 43 for controlling on or off of a light-emitting diode contained in the light emitting circuit 18 based on the sensed tape taken-up position, a determination signal generating unit 46 for generating a position determining signal for controlling the power distribution to the light receiving circuits 19 and 20, and a system controller 44 for controlling an overall function of the apparatus.

The components 1 to 20 are the same as those of the running system of the invention as shown in FIG. 1.

Now, description will be oriented to the operation of the recording and reproducing apparatus according to this embodiment.

In response to a recording or reproducing request issued to the system, the system controller 44 operates to instruct the start of the drum motor to the drum servo processing unit 39. Then, the system controller 44 operates to instruct the start of the capstan motor to the capstan servo processing unit 40. When the capstan motor is started and the tape running is started with the tape pressed between the capstan shaft and the pinch roller, the capstan motor FG signal, the supply reel FG signal and the take-up reel FG signal are output. The tape taken-up position sensing unit 42 operates to derive the tape taken-up position from these three FG signals, based on the foregoing principle.

Until the tape taken-up position is established or determined, the tape taken-up position sensing unit 42 operates to issue a signal indicating that the position is not determined to the LED controller 43, the tape end determining unit 41, the AD converter 37, and the system controller 44. Further, the signal is indicated to the light receiving circuits 19 and 20 through a proper output pin provided in the microprocessor. This results in activating all the functions provided in the conventional tape end sensing continuously or at predetermined intervals. During this period, in response to the indication the LED controller 43 operates to activate the light-emitting diode contained in the light emitting circuit 18.

When the tape taken-up position is established or determined, the position is output to each of the above-mentioned components. If the position is distant from the tape end, the tape taken-up position sensing unit 42 turns off the light emitting diode through the LED controller 43 and stops the operations of the AD converter 37 and the tape end determining unit 41 and further stops the power distribution to the light receiving circuits 19 and 20.

Figure 6:
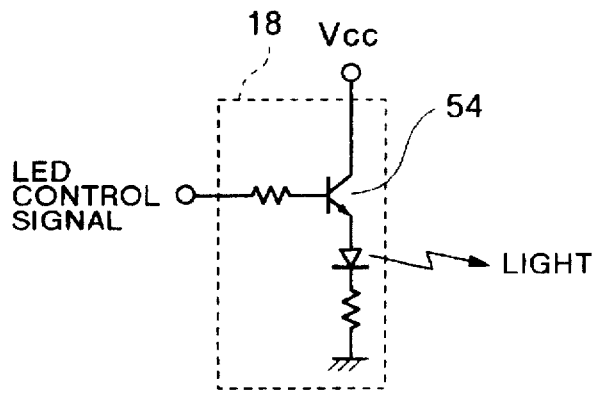
FIG. 6 is a circuit diagram showing a concrete arrangement of a light emitting circuit included in the embodiment shown in FIG. 2.

The concrete arrangement of the light emitting circuit 18 containing the LED is illustrated in FIG. 6. In FIG. 6, the determination signal generating unit 46 operates to issue the LED control signal to a base of a transistor 54. In response to an instruction given by the tape taken-up position sensing unit 42, the LED controller 43 contained in the microprocessor 34 shown in FIG. 2 operates to control the LED control signal down to the grounding potential if the taken-up position is not close to the tape end. This constantly keeps the LED off. Conventionally, the LED control signal Output from the microprocessor serves to constantly keep the LED on or off at all times. In contrast, the apparatus according to this embodiment has a function of suppressing the electric power consumed by the LED if the taken-up position is not close to the tape end.

Figure 7:
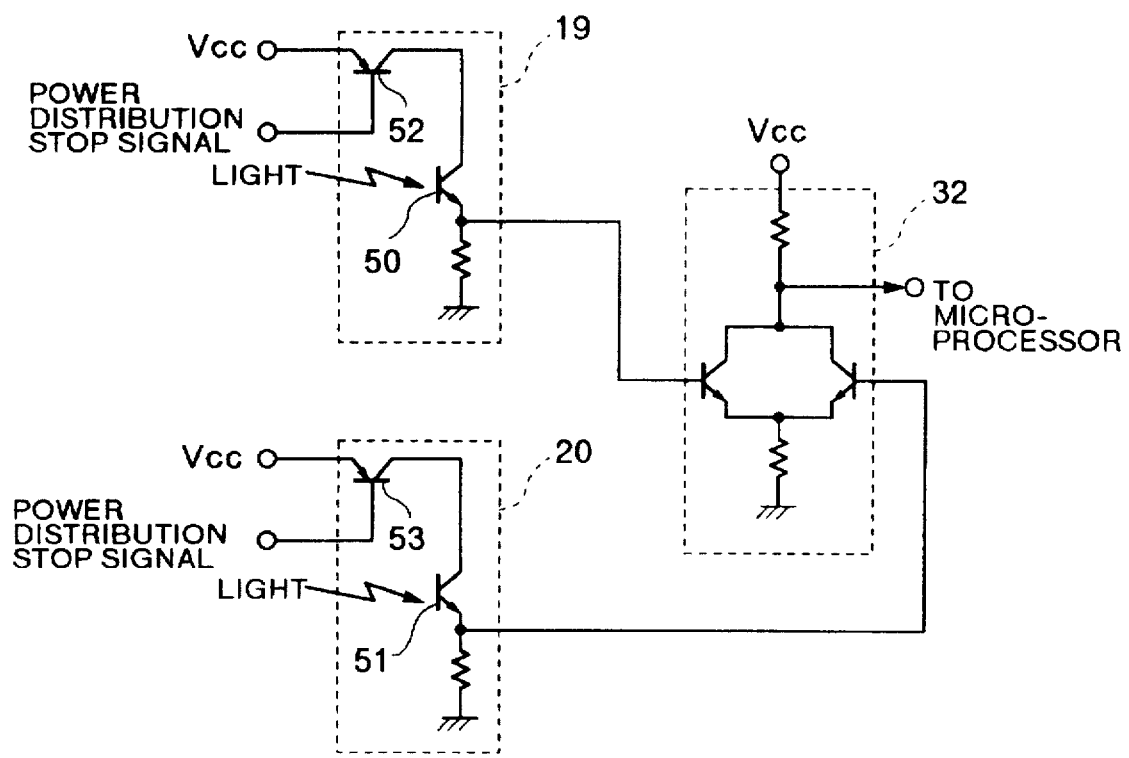
FIG. 7 is a circuit diagram showing a concrete arrangement of a light receiving circuit included in the embodiment shown in FIG. 2.

Further, a concrete arrangement for stopping the power distribution to the light receiving circuits 19 and 20 is illustrated in FIG. 7. The tape taken-up position determination signal (distribution stop signal) supplied by the microprocessor 34 is applied to the bases of transistors 52 and 53 contained in the light receiving circuits 19 and 20. If the tape taken-up position is not near the tape end, by controlling the potential at the bases of the transistors 52 and 53 down to the Vcc potential, the transistors 52 and 53 are cut off so that the power distribution to photo transistors 50 and 51 is stopped. In the conventional operation, if the light emitted from the LED contained in the light receiving circuit 18 shown in FIG. 1 is blocked by the tape and does not reach the photo transistors 50 and 51, the photo transistors 50 and 51 constantly keep on and consumes the electric power in response to the light leaked into the VTR set. Hence, the transistors 52 and 53 of the present system serve to stop the power distribution, so that the power consumption of the photo transistors is suppressed.

Moreover, the outputs from the emitters of the photo transistors 50 and 51 are applied to an adding circuit 32. The outputs from the collectors thereof are applied into the AD converter 37 of the microprocessor 34. Conventionally, the microprocessor operates to check the change of the output data of the AD converter at all times at periodic intervals and determine if the current taken-up position of the tape reaches the tape end based on the checked result. In constrast, the apparatus of this embodiment operates to stop these series of operation if the current taken-up position is not near the tape end. This results in reducing the processing burden of the microprocessor.

Figure 3:
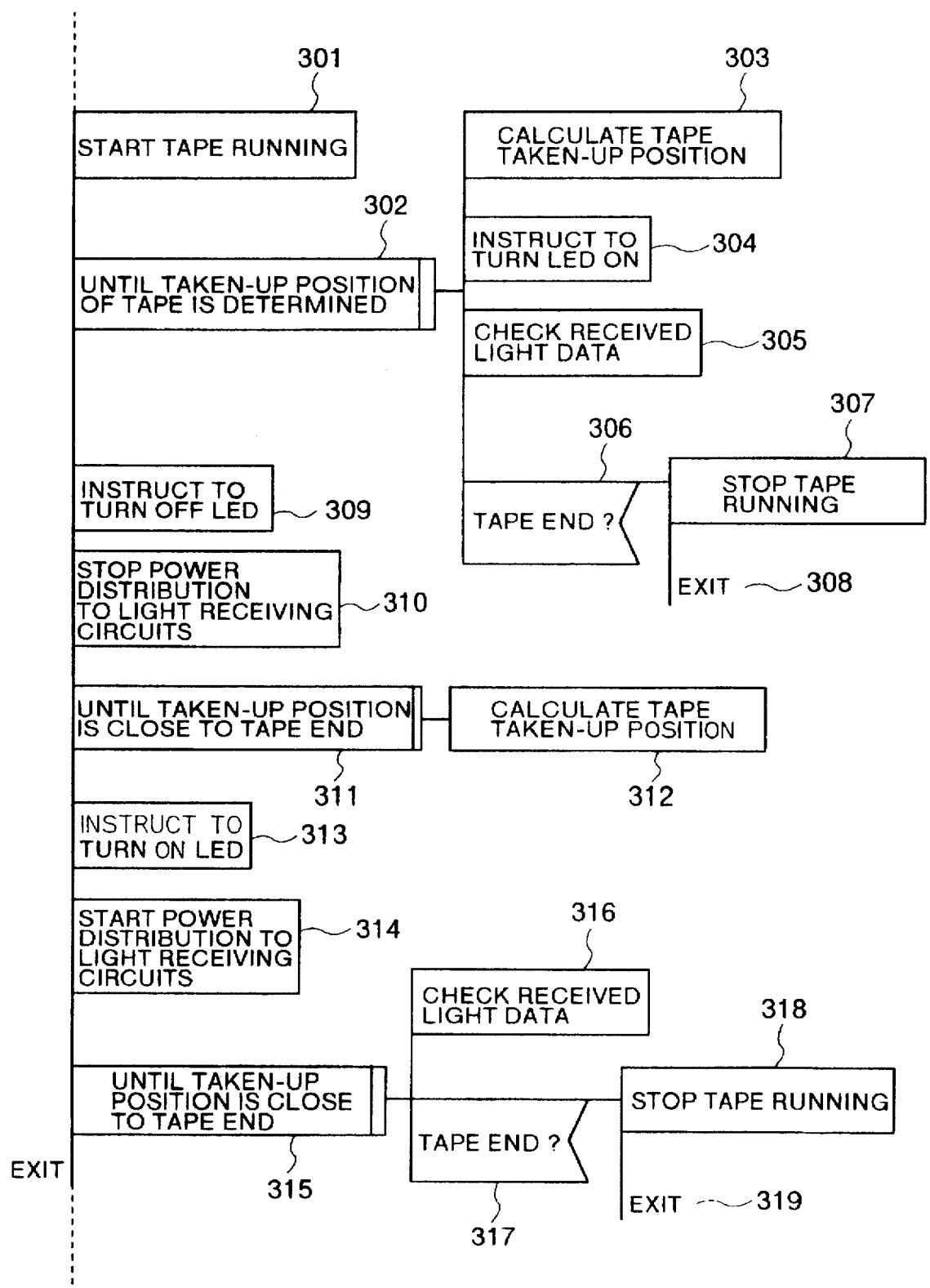
FIG. 3 is a flowchart (PAD diagram) showing an operating flow of a system controller included in this embodiment.

The aforementioned process for sensing a tape end is controlled by the system controller shown in FIG. 2. The concrete example of the process is shown in FIG. 3. As shown, when the system controller 4 receives a command of reproduction, recording, rewinding or fast feeding from a user (301), the system controller 4 operates to issue a command to the drum servo processing unit 39 and the capstan servo processing unit 40 as shown in FIG. 2 for starting the drum motor and the capstan motor. As a result, the tape running is started. Then, until the tape taken-up position is established or determined (302), the tape taken-up position is checked (303) and the LED keeps operative and is turned on like the prior art (304). The adding signals output from the light receiving circuits 19 and 20 are read into the microprocessor 34 through the AD converter 37. Then, the received-light data, which is converted into a digital signal, is checked at intervals (305) for determining if the current taken-up position is the tape end (306). If it is the tape end, the tape running is stopped (307). Once the tape is stopped, the process for sensing the tape end is not necessary. Hence, the operation jumps to the Exit step (308), where the conventional process is terminated for sensing the tape end by determining the taken-up position of the tape.

If the tape is not near the tape end, the operation is executed to turn off the LED (309) and stop the power distribution to the light receiving circuit (310). Then, while the tape taken-up position is constantly determined (312), the operation waits for when the tape comes closer to the end or a stopping indication given by the user without having to check the received light data from the light receiving circuits 19 and 20 (311). If the tape taken-up position sensing process 42 determines that the current taken-up position is near the tape end, the LED is turned on (313), the power distribution to the light receiving circuit is restarted (314), and the check for the received light data is started. Then, until the taken-up position of the tape comes closer to the tape end (315), unless the VTR changes its operation in response to the user's request, the process for sensing the tape end on the received-light data is continued (316). If the tape reaches its end (317), the tape running is stopped (318) as noted above. Then, the operation jumps to the Exit step (319), at which the operation gets out of the process for sensing the tape end.

As noted above, the recording and reproducing apparatus according to the present invention operates to stop the operation of the LED for sensing the tape end and the power distribution to the light receiving elements except that the current taken-up position of the tape is not determined or is near its end. Hence, the apparatus enables to greatly save the power consumption and stop the processes for doing an analog-to-digital conversion of the output signal from the light receiving elements and sensing the tape end, thereby allowing the load on the microprocessor to be reduced.

As mentioned above, the apparatus according to the present invention enables to turn off the light emitting elements for sensing the tape end on most of the entire tape length while the tape is running and stop the power distribution to the light receiving circuit. This makes it possible to greatly save the power consumption of the apparatus. Further, in the case of apparatuses employing a microcomputer to analyze the received-light signal and sense the tape end on the analyzed result, the analyzing program is allowed to be stopped on most area of the entire tape length while the tape is running. This also makes it possible to greatly reduce the load on the microprocessor.

What is claimed is:

1. A magnetic recording and reproducing apparatus comprising:

light emitting means for applying a ray of light to a magnetic tape having a light transmittable area on an end of said tape;

light receiving means for sensing the ray of light applied by said light receiving means and passed through said light transmittable area when the current taken-up position of said magnetic tape is the end of said tape, for sensing the tape end;

means for sensing the current taken-up position of said tape;

means for controlling the operation of said light emitting means;

wherein if said sensing means determines that the current taken-up position of said tape is close to the tape end, said control means operates said light emitting means constantly or at predetermined intervals and if said sensing means determines that the current taken-up position of said tape is distant from the tape end, said control means serves to stop the operation of said light emitting means;

wherein if said tape taken-up position sensing means fails to determine the current taken-up position of said tape, said control means enables said light emitting means to be activated continuously or constantly at predetermined intervals.

2. A magnetic recording and reproducing apparatus as claims in claim 1, further comprising:

means for taking up said magnetic tape;

means for supplying said magnetic tape;

magnetic head rotating means having a magnetic head disposed on a cylindrical peripheral surface; and tape draw out means for winding said magnetic tape around the magnetic head rotating means;

wherein a time period during which said magnetic tape draw out means is winding said magnetic tape around said magnetic head rotating means after said magnetic tape is mounted on said magnetic tape, taking up means and on said magnetic tape supplying means, is regarded as being the case in which said current taken-up position of said tape cannot be determined, and said light emission control means enables said light emitting means to be activated continuously or at predetermined intervals.

3. A magnetic recording and reproducing apparatus as claimed in claim 2, further comprising:

driving means for generating a rotational driving force for running said magnetic tape and for generating a signal proportional to a rotation frequency of said driving means;

tape running means for running said magnetic tape while pinching said tape thereon; and control means for detecting a rotational speed of said driving means and for controlling the rotational speed to achieve a target rotational speed;

wherein in the case in which the running of said tape is started by said driving means and said tape running means only after said tape draw out means winds said magnetic tape around said magnetic tape rotating means, a time period during which said rotational speed does not reach a predetermined speed is regarded as being the case in which said current taken-up position of said tape cannot be determined, and said light emission control means enables said light emitting means to be activated continuously or at predetermined intervals.

4. A magnetic recording and reproducing apparatus as claimed in claim 3, wherein said driving means generates the rotational driving force for running said magnetic tape and generates the signal proportional to the rotation frequency of said driving means;

said tape take-up means takes up said tape by rotation and generates a signal proportional to a rotation frequency of said tape take-up means, and said tape supplying means supplies said tape by rotation and generates a signal proportional to a rotation frequency of said tape supplying means, wherein the signals generated by said driving means, said tape take-up means, and said tape supplying means, and proportional to the respective rotation frequencies are square waves, and said means for sensing the current taken-up position is a program on a microprocessor, and wherein the running of said tape is started only after said tape is wound around said magnetic head rotating means by said magnetic tape draw out means, and a time period after rotational speed detecting means of said driving means detects that a rotational speed reaches a predetermined rotational speed, until each rotation frequency can be measured, in order that the program senses the current taken-up position of said tape, from a leading edge or a trailing edge, or both thereof of each of the square wave signals proportional to the respective rotation frequencies generated by said driving means, said tape take-up means, and said tape supply means, is regarded as being the case in which said current taken-up position of said tape cannot be determined, and said light emission control means enables said light emitting means to be activated continuously or at predetermined intervals.

5. A magnetic recording and reproducing apparatus as claimed in claim 4, wherein a time period after each of the rotation frequencies is measured from a leading edge or a trailing edge, or both thereof of each of the square wave signals proportional to the respective rotation frequencies generated by said tape taken-up means and said tape supply means, until the current taken-up position is calculated from the respective rotation frequencies is regarded as being the case in which said current taken-up position of said tape cannot be determined, and said light emission control means enables said light emitting means to be activated continuously or at predetermined intervals.

6. A magnetic recording and reproducing apparatus as claimed in claim 1, further comprising:

driving means for generating a rotational driving force for running said magnetic tape and for generating a signal proportional to a rotation frequency of said driving means;

tape running means for running said magnetic tape while pinching said tape thereon; and control means for detecting a rotational speed from the signal proportional to the rotation frequency generated by said driving means and for controlling the rotational speed to achieve a target rotational speed;

wherein a time period during which said rotational speed does not reach a predetermined speed after the running of said tape is started by said driving means and said tape running means, is regarded as being the case in which said current taken-up position of said tape cannot be determined, and said light emission control means enables said light emitting means to be activated continuously or at predetermined intervals.

7. A magnetic recording and reproducing apparatus as claimed in claim 1 further comprising:

driving means for generating a rotational driving force for running said magnetic tape and for generating a signal proportional to a rotation frequency of said driving means;

tape take-up means for taking up said magnetic tape by rotation and for generating a signal proportional to a rotation frequency of said tape take-up means; and tape supply means for supplying said magnetic tape by rotation and for generating a signal proportional to a rotation frequency of said tape supply means;

wherein the signals generated by said driving means, said tape take-up means, and said tape supply means, and proportional to the respective rotation frequencies are square waves, and said means for sensing the current taken-up position is a program on a microprocessor, and wherein a time period after the running of said tape is started until each of the rotation frequencies can be measured, in order to sense the current taken-up position of said tape, from a leading edge or a trailing edge, or both thereof of each of the square wave signals proportional to the respective rotation frequencies generated by said driving means, said tape take-up means, and said tape supply means, is regarded as being the case in which said current taken-up position of said tape cannot be determined, and said light emission control means enables said light emitting means to be activated continuously or at predetermined intervals.

8. A magnetic recording and reproducing apparatus as claimed in claim 1, further comprising:

driving means for generating a rotational driving force for running said magnetic tape and for generating a signal proportional to a rotation frequency of said driving means;

tape take-up means for taking up said magnetic tape by rotation and for generating a signal proportional to a rotation frequency of said tape take-up means; and tape supply means for supplying said magnetic tape by rotation and for generating a signal proportional to a rotation frequency of said tape supply means;

wherein the signals generated by said driving means, said tape take-up means, and said tape supply means, and proportional to the respective rotation frequencies are square waves; and said means for sensing the current taken-up position is a program on a microprocessor, and wherein a time period after the program, in order to sense the current taken-up position of said tape, measures each of the rotation frequencies from a leading edge or a trailing edge, or both thereof of each of the square wave signals proportional to the respective rotation frequencies generated by said driving means, said tape take-up means, and said tape supply means, subsequent to the start of running of said tape until the current taken-up position is calculated from the respective rotation frequencies is regarded as being the case in which said current taken-up position of said tape cannot be determined, and said light emission control means enables said light emitting means to be activated continuously or at predetermined intervals.

9. A magnetic recording and reproducing apparatus as claimed in claim 8, wherein said means for sensing the taken-up position calculates a radius of said tape supply means including the tape wound thereon on the basis of the respective rotation frequencies of said driving means, said tape take-up means and said tape supply means, and on the basis of a tape thickness of said magnetic tape, and said means for sensing the taken-up position determines that the taken-up position of the tape is close to the tape end when a difference between the radius of the tape supply means including the tape and a radius of the tape supply means having no tape wound thereon reaches a predetermined value or less.

10. A magnetic recording and reproducing apparatus as claimed in claim 9, wherein a plurality of radii are available to said tape supply means depending on a type thereof when the tape is not wound thereon, and means is provided for calculating a total areas including said tape, said tape take-up means, and said tape supply means on the basis of said driving means, said tape take-up means, said tape supply means, and a tape thickness of said magnetic tape, and a radius of said tape supply means when no tape is wound thereon is classified by said means.

11. A magnetic recording and reproducing apparatus comprising:

light emitting means for applying a ray of light to a magnetic tape having a light transmittable area on an end of said tape;

light receiving means for sensing the ray of light applied by said light emitting means and passed through said light transmittable area when the current taken-up position of said magnetic tape is the end of said tape, for sensing the end of said tape;

means for sensing the current taken-up position of said tape;

means for controlling power distribution to said light to said light receiving means;

wherein if said tape taken-up position sensing means determines the current taken-up position of said tape to be near the tape end, said power distribution control means serves to constantly distribute electric power to said light receiving means and if said tape taken-up position sensing means determines the current taken-up position to be distant from said tape end, said power distribution control means serves to stop the power distribution to said light receiving means;

wherein if said tape taken-up position sensing means fails to determine the current taken-up position of said tape, said power distribution means serves to constantly distribute electric power to said light receiving means.

12. A magnetic recording and reproducing apparatus as claims in claim 11, further comprising:

means for taking up said magnetic tape;

means for supplying said magnetic tape;

magnetic head rotating means having a magnetic head disposed on a cylindrical peripheral surface; and tape draw out means for winding said magnetic tape around the magnetic head rotating means;

wherein a time period during which said magnetic tape draw out means is winding said magnetic tape around said magnetic head rotating means after said magnetic tape is mounted on said magnetic tape taking up means and on said magnetic tape supplying means, is regarded as being the case in which said current taken-up position of said tape cannot be determined, and said power distribution means serves to continuously distribute electric power to said light receiving means.

13. A magnetic recording and reproducing apparatus as claimed in claim 11, further comprising:

driving means for generating a rotational driving force for running said magnetic tape and for generating a signal proportional to a rotation frequency of said driving means;

tape running means for running said magnetic tape while pinching said tape thereon; and control means for detecting a rotational speed of said driving means and for controlling the rotational speed to achieve a target rotational speed;

wherein in the case in which the running of said tape is started by said driving means and said tape running means only after said tape draw out means winds said magnetic tape around said magnetic tape rotating means, a time period during which said rotational speed does not reach a predetermined speed is regarded as being the case in which said current taken-up position of said tape cannot be determined, and said power distribution means serves to continuously distribute electric power to said light receiving means.

14. A magnetic recording and reproducing apparatus as claimed in claim 13, wherein said driving means generates rotational driving force for running said magnetic and generates the signal proportional to the rotation frequency of said driving means;

said tape take-up means takes up said tape by rotation and generates a signal proportional to a rotation frequency of said tape take-up means, and said tape supplying means supplies said tape by rotation and generates a signal proportional to a rotation frequency of said tape supplying means wherein the signals generated by said driving means, and proportional to the respective rotation frequencies are square waves, and said means for sensing the current taken-up position is a program a microprocessor, and wherein the running of said tape is start only after said tape is wound around said magnetic rotating means by said magnetic tape draw out means, and a time period after rotational speed detecting means of said driving means detects that a rotation speed reaches a predetermined rotational speed, until each rotation frequency can be measured, in order t the program senses the current taken-up position of said tape, from a leading edge or a trailing edge, or both thereof of each of the square wave signals proportional to the respective rotation frequencies generated by said driving means, said tape take-up means, and said tape supply means, is regarded as being the case in which said current taken-up position of said tape cannot be determined, and said power distribution means serves to continuously distribute electric power to said light receiving means.

15. A magnetic recording and reproducing apparatus as claimed in claim 14, wherein a time period after each of the rotation frequencies is measured from a leading edge or a trailing edge, or both thereof of each of the square wave signals proportional to the respective rotation frequencies generated by said tape take-up means and said tape supply means, until the current taken-up position is calculated from the respective rotation frequencies is regarded as being the case in which said current taken-up position of said tape cannot be determined, and said power distribution means serves to continuously distribute electric power to said light receiving means.

16. A magnetic recording and reproducing apparatus as claimed in claim 11, further comprising:

driving means for generating a rotational driving force for running said magnetic tape and for generating a signal proportional to a rotation frequency of said driving means;

tape running means for running said magnetic tape while pinching said tape thereon; and control means for detecting a rotational speed from the signal proportional to the rotation frequency generated by said driving means and for controlling the rotational speed to achieve a target rotational speed;

wherein a time period during which said rotational speed does not reach a predetermined speed after the running of said tape is started, by said driving means and said tape running means, is regarded as being the case in which said current taken-up position of said tape cannot be determined, and said power distribution means serves to continuously distribute electric power to said light receiving means.

17. A magnetic recording and reproducing apparatus as claimed in claim 11, further comprising:

driving means for generating a rotational driving force for running said magnetic tape and for generating a signal proportional to a rotation frequency of said driving means;

tape take-up means for taking up said magnetic tape by rotation and for generating a signal proportional to a rotation frequency of said tape take-up means; and tape supply means for supplying said magnetic tape by rotation and for generating a signal proportional to a rotation frequency of said tape supply means;

wherein the signals generated by said driving means, said tape take-up means, and said tape supply means, and proportional to the respective rotation frequencies are square waves, and said means for sensing the current taken-up position is a program on a microprocessor, and wherein a time period after the running of said tape is started until each of the rotation frequencies can be measured, in order to sense the current taken-up position of said tape, from a leading edge or a trailing edge, or both thereof of each of the square wave signals proportional to the respective rotation frequencies generated by said driving means, said tape take-up means, and said tape supply means, is regarded as being the case in which said current taken-up position of said tape cannot be determined, and said power distribution means serves to continuously distribute electric power to said light receiving means.

18. A magnetic recording and reproducing apparatus as claimed in claim 11, further comprising:

driving means for generating a rotational driving force for running said magnetic tape and for generating a signal proportional to a rotation frequency of said driving means;

tape take-up means for taking up said magnetic tape by rotation and for generating a signal proportional to a rotation frequency of said tape take-up means; and tape supply means for supplying said magnetic tape by rotation and for generating a signal proportional to a rotation frequency of said tape supply means;

wherein the signals generated by said driving means, said tape take-up means, and said tape supply means, and proportional to the respective rotation frequencies are square waves; and said means for sensing the current taken-up position is a program on a microprocessor, and wherein a time period after the program, in order to sense the current taken-up position of said tape, measures each of the rotation frequencies from a leading edge or a trailing edge, or both thereof of each of the square wave signals proportional to the respective rotation frequencies generated by said driving means, said tape take-up means, and said tape supply means, subsequent to the start of running of said tape until the current taken-up position is calculated from the respective rotation frequencies is regarded as being the case in which said current taken-up position of said tape cannot be determined, and said power distribution means serves to continuously distribute electric power to said light receiving means.

19. A magnetic recording and reproducing apparatus as claimed in claim 18, wherein said means for sensing the taken-up position calculates a radius of said tape supply means including the tape wound thereon on the basis of the respective rotation frequencies of said driving means, said tape take-up means and said tape supply means, and on the basis of a tape thickness of said magnetic tape, and said means for sensing the taken-up position determines that the taken-up position of the tape is close to the tape end when a difference between the radius of the tape supply means-including the tape and a radius of the tape supply means having no tape wound thereon reaches a predetermined value or less.

20. A magnetic recording and reproducing apparatus as claimed in claim 19, wherein a plurality of radii are available to said tape supply means depending on a type thereof when the tape is not wound thereon, and means is provided for calculating a total areas including said tape, said tape take-up means, and said tape supply means on the basis of said driving means, said tape take-up means, said tape supply means, and a tape thickness of said magnetic tape, and a radius of said tape supply means when no tape is wound thereon is classified by said means.

21. A magnetic recording and reproducing apparatus comprising:

light emitting means for applying a ray of light to a magnetic tape having a light transmittable area on an end of said tape;

light receiving means for sensing the ray of light applied by said light receiving means and passed through said light-transmittable area when the current taken-up position of said magnetic tape is the end of said tape, for sensing the tape end;

means for sensing the current taken-up position of said tape;

means for controlling the operation of said light emitting means;

wherein if said sensing means determines that the current taken-up position of said tape is close to the tape end; said control means operates said light emitting means at a first predetermined interval and if said sensing means determines that the current taken-up position of said tape is distant from the tape end, said control means operates said light emitting means at a second predetermined interval which is longer than said first predetermined interval, and wherein if said tape taken-up position sensing means fails to determine the current taken-up position of said tape, said control means enables said light emitting means to be activated at said first predetermined interval.

22. A magnetic recording and reproducing apparatus comprising:

light emitting means for applying a ray of light to a magnetic tape having a light-transmittable area on an end of said tape;

light receiving means for sensing the ray of light applied by said light emitting means and passed through said light-transmittable area when the current taken-up position of said magnetic tape is the end of said tape, for sensing the end of said tape;

means for sensing the current taken-up position of said tape;

means for controlling power distribution to said light to said light receiving means:

wherein if said tape taken-up position sensing means determines the current taken-up position of said tape to be near the tape end, said power distribution control means serves to distribute electric power to said light receiving means at a first predetermined interval and if said tape taken-up position sensing means determines the current taken-up position to be distant from said tape end, said power distribution control means serves to distribute the electric power to said light receiving means at a second predetermined interval longer than said first predetermined interval, and wherein if said tape taken-up position sensing means fails to determine the current taken-up position of said tape, said power distribution means serves to distribute electric power to said light receiving means at said first predetermined interval.

23. A magnetic recording and reproducing apparatus comprising:

a magnetic tape having a leader tape at an end of the tape;

means for detecting the leader tape;

means for detecting a residual amount of said magnetic tape; and means for varying a detection period of said leader tape detecting means;

wherein said leader tape detecting means is operated when said tape residual amount detecting means determines that the residual amount of said tape is small, said detection period of said leader tape detecting means has been set shorter when said residual amount detecting means determines that the tape residual amount is small as compared when said residual amount detecting means determines that the tape residual amount is sufficiently large, or said leader tape detecting means has been stopped operating when said residual amount detecting means determines that a tape residual amount is sufficient, and wherein if said tape residual amount detecting means fails to determine a tape residual amount, said leader tape detecting means is operated as is the case when said tape residual amount detecting means determines that the residual amount of said tape is small.

* * * * *

UNITED STATES PATENT AND TRADEMARK OFFICE
CERTIFICATE OF CORRECTION

PATENT NO : 5,699,206
DATED : December 16, 1997
INVENTOR(S): Kouji MINABE et al.

It is certified that error appears in the above-identified patent and that said Letters Patent are hereby corrected as shown below:

Col. 5, line 5, change "are" to --are not--.

Col. 5, line 6, change "is" to --is not--.

Col. 5, line 8, change "is" to --is not--.

Col. 8, line 2, replace "receiving" with emitting--.

Col. 14, line 48, replace "receiving" with emitting--.

Signed and Sealed this

Fifteenth Day of May, 2001

Attest:

NICHOLAS P. GODICI

Attesting Officer    Acting Director of the United States Patent and Trademark Office